United States Patent
Lim et al.

(10) Patent No.: US 9,892,691 B1
(45) Date of Patent: Feb. 13, 2018

(54) ADAPTIVE BATTERY MANAGEMENT

(71) Applicant: Amazon Technologies, Inc., Seattle, WA (US)

(72) Inventors: James Robert Lim, San Jose, CA (US); Bryan Holmdahl, Santa Clara, CA (US); Mudit Sunilkumar Khasgiwala, Milpitas, CA (US); Chang Hwa Rob Yang, San Jose, CA (US); Vidhyananth Ramasamy Venkatasamy, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/196,722

(22) Filed: Jun. 29, 2016

Related U.S. Application Data

(63) Continuation-in-part of application No. 14/854,508, filed on Sep. 15, 2015.

(51) Int. Cl.
  *G09G 3/34* (2006.01)
  *G06F 1/32* (2006.01)
  *G06F 3/0483* (2013.01)

(52) U.S. Cl.
  CPC ......... *G09G 3/3406* (2013.01); *G06F 1/3212* (2013.01); *G06F 1/3265* (2013.01); *G06F 3/0483* (2013.01); *G09G 2320/0626* (2013.01); *G09G 2330/021* (2013.01); *G09G 2380/14* (2013.01)

(58) Field of Classification Search
  CPC .......................... G09G 3/3406; G01R 31/3662
  See application file for complete search history.

(56) References Cited

U.S. PATENT DOCUMENTS

| | | | |
|---|---|---|---|
| 6,922,151 B2 | 7/2005 | Kawakami | |
| 7,348,101 B2 | 3/2008 | Gozdz et al. | |
| 7,782,018 B2 | 8/2010 | Voigt | |
| 8,159,228 B2 * | 4/2012 | Ferre ........... | G01R 31/3662 324/430 |
| 2002/0061436 A1 | 5/2002 | Inagaki et al. | |
| 2010/0291442 A1 | 11/2010 | Wang et al. | |
| 2011/0143218 A1 | 6/2011 | Issaev et al. | |
| 2012/0007556 A1 | 1/2012 | Matsui et al. | |
| 2012/0202099 A1 | 8/2012 | Perry et al. | |
| 2013/0323607 A1 | 12/2013 | Issaev et al. | |
| 2014/0050972 A1 | 2/2014 | Amiruddin et al. | |

(Continued)

OTHER PUBLICATIONS

Kadirvel, "Fundamentals of battery fuel-gauging," Texas Instruments, 5 pages, (Nov. 16, 2012).

(Continued)

*Primary Examiner* — Kevin M Nguyen
(74) *Attorney, Agent, or Firm* — K&L Gates LLP

(57) ABSTRACT

Systems and methods are provided for optimizing battery life in an electronic device. The device is configured to make periodic assessments of battery capacity by measuring the DC resistance value of the battery cell. The temperature of the battery cell and/or other characteristics of the device are used to determine a threshold DC resistance level. If the measured DC resistance value reaches a determined threshold level, the device can initiate a power-saving mode in which an operating parameter of the device is adjusted to decrease power consumption.

20 Claims, 12 Drawing Sheets

(56) References Cited

U.S. PATENT DOCUMENTS

2014/0217984 A1 8/2014 Banerjee et al.
2015/0241521 A1* 8/2015 Wu .................... G01R 31/3662
702/63

OTHER PUBLICATIONS

Krafthoefer, "Measure Battery Capacity Precisely in Medical Design," Power Electronics Technology, 6 pages, (Jan. 2005).
Schweiger et al., "Comparison of Several Methods for Determining the Internal Resistance of Lithium Ion Cells," Sensors, 10, pp. 5604-5625, (2010).
Vega et al., "Selecting an Impedance Track™ Gas Gauge for Li-Ion Single Cell Applications," Texas Instruments, SLUA638, 8 pages, (May 2013).
Yu et al., "Select the right battery fuel-gauge for smart phones and tablets," EDN Network, Available at: http://edn.com/design/power-management/4376050/Select-the-right-battery-fuel-gauge-for-smart-phones-and-tablets, 6 pages,(Jun. 25, 2012).
PCT Application No. PCT/US2016/037216. International Search Report and Written Opinion dated Aug. 16, 2016, 15 pages.
Author Unknown, "Thinergy MEC 220 Solid-State Flexible, Rechargeable Thin-Film Micro-Energy Cell," Available at: https://people.ece.cornell.edu/land/courses/ece4760/FinalProjects/s2012/ads264_mws228/Final_Report/Final_Report/ThinergyMEC220.pdf, (Sep. 20, 2011).
Lu et al., "Electrochemical performance of $Li_{4/3}Ti_{5/3}O_4Li_{1+x}(Ni_{1/3}Mn_{1/3})_{1-x}O_2$ cell for high power applications," Journal of Power Sources, Elsevier SA, CH, vol. 167, No. 1, pp. 212-216, (2007).

* cited by examiner

ADAPTIVE BATTERY MANAGEMENT

CROSS-REFERENCE TO RELATED APPLICATIONS

This application is a continuation-in-part of prior U.S. patent application Ser. No. 14/854,508, filed Sep. 15, 2015, the disclosure of which is incorporated herein by reference in its entirety.

BACKGROUND

Portable electronic devices, such as electronic book ("e-book") readers, smartphones, or tablet computers, have become increasingly popular. One constraint on usability for portable electronic devices is their limited battery life, due to smaller battery sizes, which requires users recharge the device after some period of usage. For all battery-powered electronic devices and e-book readers in particular, it is desirable to provide extended battery life to avoid forcing the user to recharge the e-book reader too frequently. Many users of e-book readers expect to go many days, weeks, or months on a single charge. Increasing the capacity of the battery to improve battery life generally requires an increase in the size and weight of the battery, and, therefore, the device as well. However, reduced weight and thickness are also highly desirable features for portable electronic devices, particularly e-book readers, which in typical usage, may be held in the user's hands for hours at a time.

In contrast with analog devices, which typically draw a steady current, digital devices place new demands on batteries, including loading the battery with periodic spikes of high current draw. These current spikes cause corresponding voltage drops, due to battery DC resistance values. Many of these digital devices are designed with cut-off voltages, such as 3.0V, at which point the device stops operating or shuts itself down. As a result, during normal operation, a temporary current spike can cause the device to display a low battery warning to the user and even shut itself down. Although the device could be restarted and operated at a low current draw for an additional period of time, the low battery warning caused by the current spike would cause the user to conclude that the battery is depleted and the device unusable until recharged again. In addition, precise measurement of remaining battery capacity is technically difficult, thereby making it particularly challenging to develop processes for maximizing battery life.

Accordingly, there is a need for improved battery systems that can minimize device weight and thickness while powering electronic devices, particularly those with high power and peak power demands.

DETAILED DESCRIPTION

In the following description, reference is made to the accompanying drawings which illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

In accordance with aspects of the present invention, systems and methods are provided for optimizing battery life in an electronic device. The device is configured to make periodic assessments of battery capacity by determining a DC resistance value of the battery cell. If the DC resistance value determination indicates that the battery capacity has dropped below a threshold level, the device can initiate a power-saving mode in which an operating parameter of the device is adjusted to decrease power consumption. Because various temporary device conditions can impact the measured DC resistance values, the measured DC resistance value may not accurately reflect the usable battery capacity remaining in the device at that time. As a result, the threshold level may not result in initiation of the power-saving mode in time to avoid a premature shutdown of the device. In order to better compensate for these temporary changes, the DC resistance threshold level for initiating the power-saving mode may be variable and adaptive to various device conditions, such as the current battery temperature, battery state of charge, or the number of charge cycles experienced by the battery. The use of DC resistance value measurements for assessing remaining battery capacity may be particularly advantageous for devices having a small capacity battery, as will be described in greater detail below.

Figure 1A:
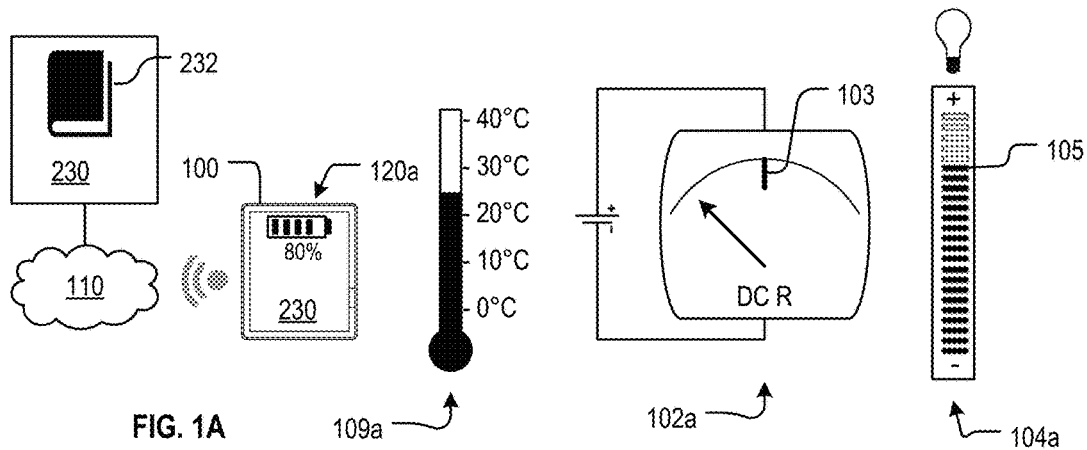
FIGS. 1A-1C illustrate a method of optimizing battery life in an e-book reader 100 using adaptive battery management, in accordance with embodiments of the present invention.
Figure 1B:
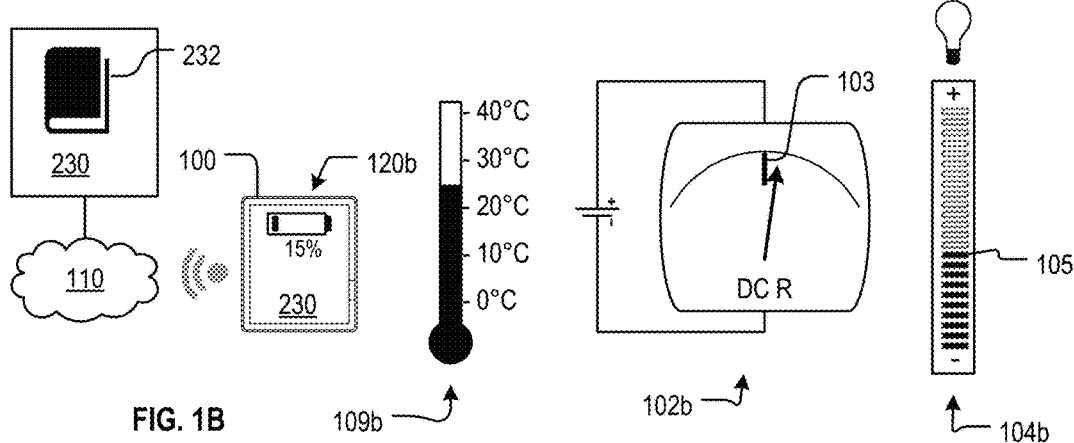
Figure 1C:
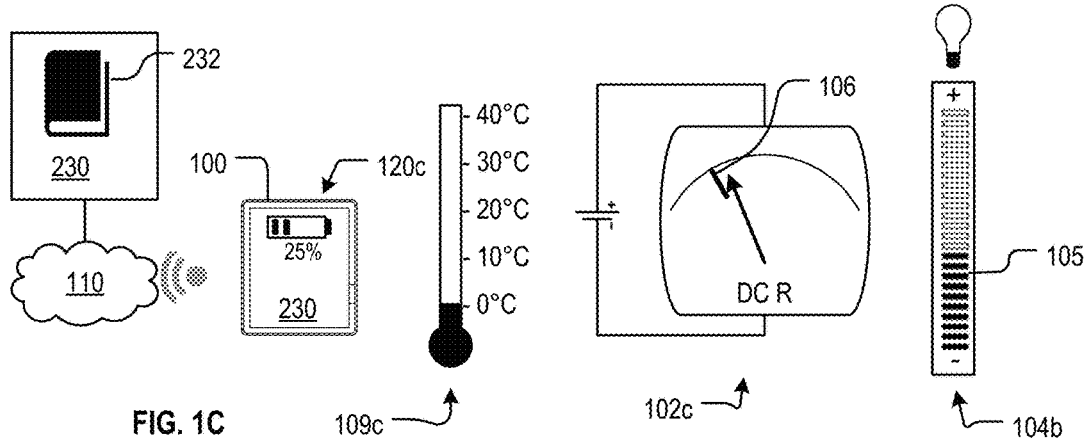

FIGS. 1A-1C illustrate a method of optimizing battery life in an e-book reader 100 using adaptive battery management, in accordance with embodiments of the present invention. In FIG. 1A, a user is attempting to download an electronic book 232 from an e-book content server 230 via a mobile communications network 110 while the battery's capacity is at a moderate level (e.g., 80% state of charge or SOC, as indicated by SOC level 120a). The wireless communications may require that the reader 100 consume power to activate an RF radio transceiver in the wireless communications interface of the reader 100 for connection with the network 110. In order to execute the book downloading operation, the reader 100 draws current from the reader's battery. DC resistance value determination 102a depicts the DC resistance value calculated based on the measured current drawn from the battery and measured change in battery voltage over the time period during which the book downloading operation is executed. The measured current could be, for example, the average of multiple current measurements taken over a period of time to provide an average current load, and the measured change in battery voltage could be, for example, the average of multiple battery voltage measurements taken over the period of time to provide an average voltage change. Alternatively, the measured current could be, for example, the largest current out of multiple current measurements taken over a period of time to provide a peak current load, and the measured change in battery voltage could be, for example, the largest change in battery voltage out of multiple voltage measurements taken over the period of time to provide a peak voltage change. In this case, the peak voltage change is divided by the peak current load to provide a peak DC resistance value.

The DC resistance value may be determined based on the measured current draw and voltage change according to any desired schedule. For example, the reader 100 may be configured to determine the DC resistance value upon the occurrence of a power-consuming operation of the reader 100. In some embodiments, the DC resistance value may be determined upon the occurrence of a high current pulse event, such as an event which draws greater than, for example, 0.5 C (i.e., current rate that is 0.5 times the capacity rating per hour of the battery, such as, e.g., 0.5×250 mAh/h=125 mA current rate). In other embodiments, the DC resistance values may be measured based on user behavior, such as, for example, in an e-book reader device, every time the user issues a page turn command, or after a prescribed number of page turn commands have been received (e.g., 4 page turns). The DC resistance value of the battery during execution of the book downloading operation can be calculated by dividing the measured voltage drop (or average voltage) during execution of the page-turn operation by the measured current (or average current) during execution of the book downloading operation. (DC resistance value determination 102a is a simplified block diagram intended for illustrative purposes only and is not to scale and does not reflect actual measurements or circuit architectures.)

As will be described in greater detail below, when the temperature of a battery cell is below approximately 25° C., the battery cell's measured DC resistance may increase. During the book downloading operation shown in FIG. 1A, the temperature of the battery is determined to be approximately 25° C. The temperature measurement 109a may be made by a temperature sensor (e.g., a thermistor or thermocouple) in the battery pack configured to measure the temperature of the battery cell contained in the battery pack. Because the battery temperature under normal situations and excluding aging effects does not cause an increase in measured DC resistance at temperatures above approximately 25° C., the threshold DC resistance level 103 may remain at a default level for that battery. Because the battery's capacity is at a moderate level, the calculated DC resistance value during the book downloading operation remains below the threshold DC resistance level 103. Accordingly, it may be concluded that the remaining battery capacity is sufficient for continued normal usage during the book downloading operation, so no action is taken to reduce power consumption of the reader 100.

FIG. 1B shows a second book downloading operation which occurs when the battery's capacity is at a low level (e.g., 15% SOC, as indicated by SOC level 120b) and the temperature of the battery cell is determined to be approximately 25° C. As in FIG. 1A, the DC resistance value determination 102b is made immediately before and/or during the book downloading operation. Because the battery's capacity is at a low level, the change in the measured voltage of the battery during the execution of the book downloading operation is higher, resulting in a increased calculated DC resistance value. If this calculated DC resistance value is higher than the threshold DC resistance level 103, the reader 100 initiates a power-saving mode. For example, if a 0.5 A current pulse is passed for 10-50 msec during execution of the book downloading operation, the measured drop in voltage over that same time period may be, e.g., 0.1 V. The DC resistance value can be calculated as R=V/I, which produces a calculated 200 mOhm of DC resistance value in the scenario above. This is merely an illustrative example, and in other embodiments, the current and voltage measurements may be made differently, as will be described in greater detail below.

The changes made by the reader 100 in power-saving mode may vary in different embodiments. In some embodiments, the display 230 of the reader 100 includes a front light or backlight for illuminating the display 230. This light provides a user-adjustable level of brightness, with higher brightness levels consuming more power than lower levels.

In FIG. 1A, the user has set the display brightness at a first level 104a. As long as the battery capacity remains above a low level, as determined with each DC resistance value measurement, the display brightness will remain at the first level 104a (e.g., the brightness level previously selected by the user). However, once the device 100 measures a high DC resistance value during a book downloading operation, which reflects a low remaining battery capacity, the device 100 will initiate a power-saving mode in which the brightness of the display 230 is reduced. The book downloading operation is given a higher priority than the display brightness, so the brightness is reduced while the wireless communications operation operates at full power. The higher priority may be desired in order to improve the user's experience while downloading books by maintaining the speed with which the book 232 is wirelessly downloaded.

In some embodiments, the reduction in the display brightness will be indicated in the user interface as a reduced level 104b in which fewer level bars are darkened. In other embodiments, the user interface may not provide any indication to the user of any changes due to the power-saving mode, so the user interface will continue to show brightness at the first level 104a with no change in the number of level bars 105 darkened. However, the actual brightness level of the backlight corresponding to the displayed level 104a will be reduced, thereby reducing power consumption without providing an indication to the user. In other embodiments, the device 100 may generate a notification to the user (e.g., with a pop-up box or other indication) informing the user of the low battery and providing the user with the option of initiating a power-saving mode in which the brightness is reduced, or to continue operating the device 100 without any power-saving changes, and thereby risk imminent shutdown caused by the low battery capacity.

FIG. 1C shows a third book downloading operation which occurs when the battery's capacity is slightly higher than in FIG. 1B (e.g., 25% SOC, as shown by SOC level 120c), but the device 100 is being operated in a cold environment, thereby causing the measured temperature of the battery cell to be approximately 0° C. As in FIG. 1A, the DC resistance value determination 102c is made immediately before and/or during the book downloading operation. As described above, at low temperatures, the measured DC resistance may be higher than would normally be measured at that battery capacity level when the battery cell is at a temperature above approximately 25° C. Therefore, even though the battery's capacity is at the same high level as in FIG. 1A, the measured DC resistance 102c is determined to be much higher than the measured DC resistance value determination 102a in FIG. 1A based on measurement of the same power-consuming operation. If the threshold DC resistance level for initiating the power-saving mode remains at the same threshold DC resistance level 103 in FIG. 1A, the measured DC resistance may be less than the threshold DC resistance level 103, so the power-saving mode would not be initiated. However, because the DC resistance 102c at 0° C. for the same power-consuming operation is much higher than the DC resistance 102a at 25° C., the spike in the measured DC resistance 102c may trigger the device to enter a shut-down mode, as would occur when the battery is almost competely depleted, even though there is adequate battery capacity to continue operation. The low temperature of the battery cell would cause the DC resistance level to increase far above what would normally be seen at normal temperatures, thereby providing an incorrect indication of a low battery capacity.

In accordance with embodiments of the present invention, the threshold DC resistance level for initiating the power-saving mode may be adjusted based on the state of or characteristics of the device 100. In the embodiment illustrated in FIG. 1C, the threshold DC resistance level 106 for initiating the power-saving mode is adjusted based on the temperature of the battery cell. As shown in FIG. 1C, because the battery cell temperature is approximately 0° C., the threshold DC resistance level decreased from the default threshold DC resistance level 103 to the decreased threshold DC resistance level 106. As a result, when the DC resistance value is determined to be greater than the decreased threshold DC resistance level 106, the power-saving mode is initiated and the brightness is decreased to the reduced level 104b. Even though the DC resistance value may be less than the original threshold DC resistance level 103 and therefore not of sufficient magnitude as to cause the power-saving mode if the battery were at 25° C., it is desirable to cause the device to enter power-saving mode earlier than would normally occur at 25° C. so as to prevent a premature shut down of the device. The device 100 continues in the power-saving mode so that the brightness level remains at the reduced brightness level 104b until the temperature of the battery rises to a higher level (e.g., 25° C.).

The amount by which the brightness is decreased may vary. In some embodiments, the brightness is decreased by a predetermined amount upon detection of a DC resistance value above the threshold DC resistance level. In other embodiments, the brightness may be decreased by a variable amount, depending on the one or more factors, such as, for example, the remaining battery capacity, the processes currently running on the device 100, the amount of power currently being drawn from the battery, the current threshold DC resistance level, or any other desired factor.

In other embodiments, the device 100 may initiate a power-saving mode by adjusting one or more operating parameters of the device 100 in order to reduce power consumption. In some embodiments, the power-saving mode comprises a reduction in a power output level reduction of the wireless communications interface of the device 100. Many electronic devices utilize a RF radio transceiver, such as those used for personal area network communications, local area wireless network communications, and/or wide area network communications. Those devices may initiate a power-saving mode by decreasing a power output level of the radio for communications while in power-saving mode. In embodiments having a wireless radio configured for multiple-input multiple-output (MIMO) operation, the device may initiate a power-saving mode by switching from MIMO operation to single-input and single-output (SISO) operation. This may be particularly applicable for devices configured for wireless communications using the IEEE 802.11n or IEEE 802.11ac Wi-Fi standards. In other embodiments, the device may initiate a power-saving mode by reducing the RF receiver duty cycle of the wireless radio. In some embodiments, such as those utilizing GSM wireless communications, the device may initiate a power-saving mode by implementing discontinuous reception (DRx) or other RF power-saving mode different than that requested by the GSM base station subsystem (BSS).

In some embodiments, the power-saving mode comprises a reduction in power consumption by processors and/or related components, such as by underclocking one or more of a microprocessor, graphics processor, memory, or the like. In other embodiments, the power-saving mode comprises disabling one or more functions of the device 100 considered to be nonessential, such as, e.g., the powering of connected peripherals, such as a powered headset, or by disabling the front light entirely.

In other embodiments, the power-saving mode comprises an decrease in the display refresh rate. For example, when the power-saving mode is initiated, the display refresh rate may be decreased to a fraction of the previous refresh rate, e.g., 25% or 50% of the previous refresh rate. In some e-book readers, the device is programmed to perform a double-refresh operation in which all of the pixels refreshed twice in rapid succession so as to minimize the amount of image persistence or "ghosting" that may remain after the refresh. In these embodiments, during the power-saving mode, the double-refresh operation is temporarily ceased and replaced with a single refresh operation until the power-saving mode terminates.

In other embodiments, the power-saving mode comprises a change in the debounce timing for the device 100. During normal operation of an e-book reader device or other battery-powered electronic device, numerous power-consuming operations may be executed at various times, some of which place loads on the battery for extremely brief periods of time. These power-consuming operations may be, for example, a page turn operation, a display refresh operation, a media content retrieval operation, a content indexing operation, or a network communication operation. In some embodiments, the power-consuming operation may be a high current pulse event, such as an event which draws greater than, for example, 0.5 C (i.e., current rate that is 0.5 times the capacity rating per hour of the battery, such as, e.g., 0.5×250 mAh/h=125 mA current rate). In other embodiments, the power-consuming operation may comprise a series of one or more predetermined operations, such as, e.g., in an e-book reader device, every time the user issues a page turn command, or after a prescribed number of page turn commands have been received (e.g., 4 page turns). If the battery voltage is measured during the execution of one of these transient operations, the calculated DC resistance value may be much higher than if the voltage was measured just milliseconds later. As a result, the DC resistance values may provide an inaccurate indication of battery capacity, resulting in unnecessary initiation of the power-saving mode. To avoid this situation, the DC resistance values may be determined multiple times over a predetermined period of time, and those multiple values may be collectively used to determine the DC resistance value to compare against the threshold DC resistance level. The predetermined period of time may be referred to as the "debounce" time. The multiple DC resistance values may be analyzed to produce the determined DC resistance value in various ways, such as by taking an average of the multiple values, by selecting the peak DC resistance value during that period of time, or any other desired method. In these embodiments, the power-saving mode is only initiated when the determined DC resistance value (e.g., the average DC resistance value for that period of time) is greater than the threshold DC resistance level. In some embodiments, the debounce period of time during which the multiple DC resistance values are measured may be adjusted based on the state of the device. For example, if the temperature of the battery cell is below 25° C., the debounce period of time may be increased from about 1 msec to about 5 seconds.

In the embodiments shown in FIGS. 1A-1C, the book downloading operation is given a higher priority than the display brightness, so the brightness is reduced while the wireless communications operation operates at full power. In other embodiments, different prioritizations may be used. For example, it may be desired to prioritize display brightness over book downloading, in which case the power-saving mode would reduce the power used for wireless communications in favor of maintaining the display brightness. In other embodiments, certain communications operations, such as the receipt of one or more system files over via the device's wireless interface, may be prioritized over the display brightness or other operation. In yet other embodiments, certain operations, such as wireless communications, may be temporarily prohibited until the device exits the power-saving mode.

In accordance some embodiments, the DC resistance value monitoring may be implemented in a device having a small capacity battery. This device may be part of a modular computing system which includes a supplemental battery module with a larger capacity battery. The supplemental battery module may be attached to the electronic device to recharge the small capacity battery. As a result, the user may choose to use the electronic device alone, when a reduced size and weight is desired, or may choose to use the electronic device coupled to the supplemental battery to provide the user with extended battery life but with an increased size and weight. In accordance with other embodiments, the electronic device having the small capacity battery is a standalone device.

In accordance with other aspects of the present invention, systems and methods are provided for optimizing battery life in an electronic device by making periodic assessments of battery capacity by determining a DC resistance value of the battery cell during the execution of a power-consuming operation. If the DC resistance value determination indicates that the battery capacity has dropped below a threshold level during the power-consuming operation, the device can initiate a power-saving mode in which an operating parameter of the device is adjusted to decrease power consumption.

The use of DC resistance value measurements for assessing remaining battery capacity may be particularly advantageous for devices having a small capacity battery, as described above.

Figure 1D:
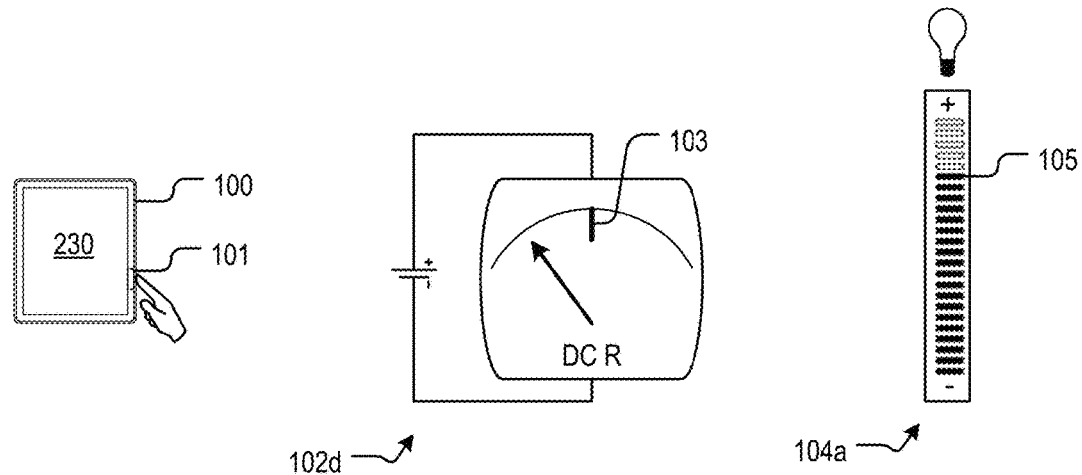
FIGS. 1D-1E illustrate a method of optimizing battery life in an e-book reader by making periodic assessments of battery capacity during execution of a power-consuming operation, in accordance with embodiments of the present invention.
Figure 1E:
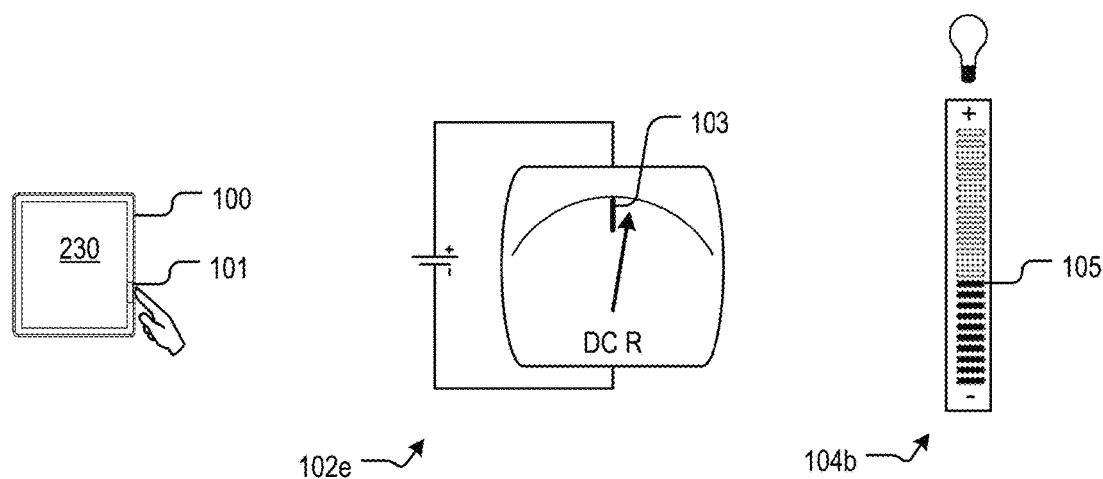

FIGS. 1D-1E illustrate a method of optimizing battery life in an e-book reader 100, in accordance with embodiments of the present invention. In FIG. 1D, a user has pressed the page-turn button 101 (or provided some other page-turn input to indicate a request for a page-turn operation, such as a touch input on in touch-screen) on the e-book reader 100 to cause the e-book reader 100 to turn the page of the e-book currently displayed on the display 230 of the e-book reader 100. This page-turn operation may require that the reader 100 consume power to activate an input sensor to detect the page-turn input, to retrieve from memory the binary data corresponding to the page to be displayed, to covert the binary data into graphical information, and then to display the graphical information as a new page for viewing by the user. In order to execute the page-turn operation, the reader 100 draws current from the reader's battery. DC resistance value determination 102d depicts the DC resistance value calculated based on the measured current drawn from the battery and measured change in battery voltage over the time period during which the page-turn operation is executed. The DC resistance value of the battery during execution of the page-turn operation can be calculated by dividing the measured voltage drop (or average voltage) during execution of the page-turn operation by the measured current (or average current) during execution of the page-turn operation.

During the page-turn operation shown in FIG. 1D, the battery's capacity is at a high level. As a result, the calculated DC resistance value during the page-turn operation remains below a threshold DC resistance level 103. Accordingly, no action is taken to reduce power consumption of the reader 100.

FIG. 1E shows a second page-turn operation which occurs when the battery's capacity is at a low level. As in FIG. 1D, after the user presses the page-turn button 101, the device 100 causes the display 230 to display the next page of the e-book. This page-turn operation results in DC resistance value determination 102e. Because the battery's capacity is at a low level, the change in the measured voltage of the battery during the execution of the page-turn operation is higher, resulting in a increased calculated DC resistance value. If this calculated DC resistance value is higher than the threshold DC resistance level 103, the reader 100 initiates a power-saving mode. For example, if a 0.5 A current pulse is passed for a prescribed period of time, e.g., 2 msec to 2 seconds or 10 msec to 50 msec, during execution of the page-turn operation, the measured drop in voltage over that same time period may be, e.g., 0.1 V. The DC resistance value can be calculated as R=V/I, which produces a calculated 200 mOhm of DC resistance value in the scenario above. This is merely an illustrative example, and in other embodiments, the current and voltage measurements may be made differently, as will be described in greater detail below.

In FIG. 1D, the user has set the display brightness at a first level 104a. As long as the battery capacity remains at a high level, as determined with each DC resistance value measurement during page-turn operations, the display brightness will remain at the first level 104a (e.g., the brightness level previously selected by the user). However, once the device 100 measures a high DC resistance value during a page-turn operation, which reflects a low remaining battery capacity, the device 100 will initiate a power-saving mode in which the brightness of the display 230 is reduced. As described above, the reduction in the display brightness may be indicated in the user interface as a reduced level 104b in which fewer level bars 105 are darkened. In other embodiments, the user interface may not provide any indication to the user of any changes due to the power-saving mode, so the user interface will continue to show brightness at the first level 104a with no change in the number of level bars 105 darkened. However, the actual brightness level of the backlight corresponding to the displayed level 104a will be reduced, thereby reducing power consumption. In other embodiments, the device 100 may generate a notification to the user (e.g., with a pop-up box or other indication) informing the user of the low battery and providing the user with the option of initiating a power-saving mode in which the brightness is reduced, or to continue operating the device 100 without any power-saving changes, and thereby risk imminent shutdown caused by the low battery capacity.

In accordance yet other embodiments, the adaptive battery management described above with respect to FIGS. 1A-1C may be used in conjunction with the DC resistance value determination during the execution of a power-consuming operation, as described above with respect to FIGS. 1D-1E. As a result, the threshold DC resistance level based on the state of the device 100, so the period DC resistance value assessments are compared to the increased threshold DC resistance levels when the battery cell is at low temperatures.

Figure 2:
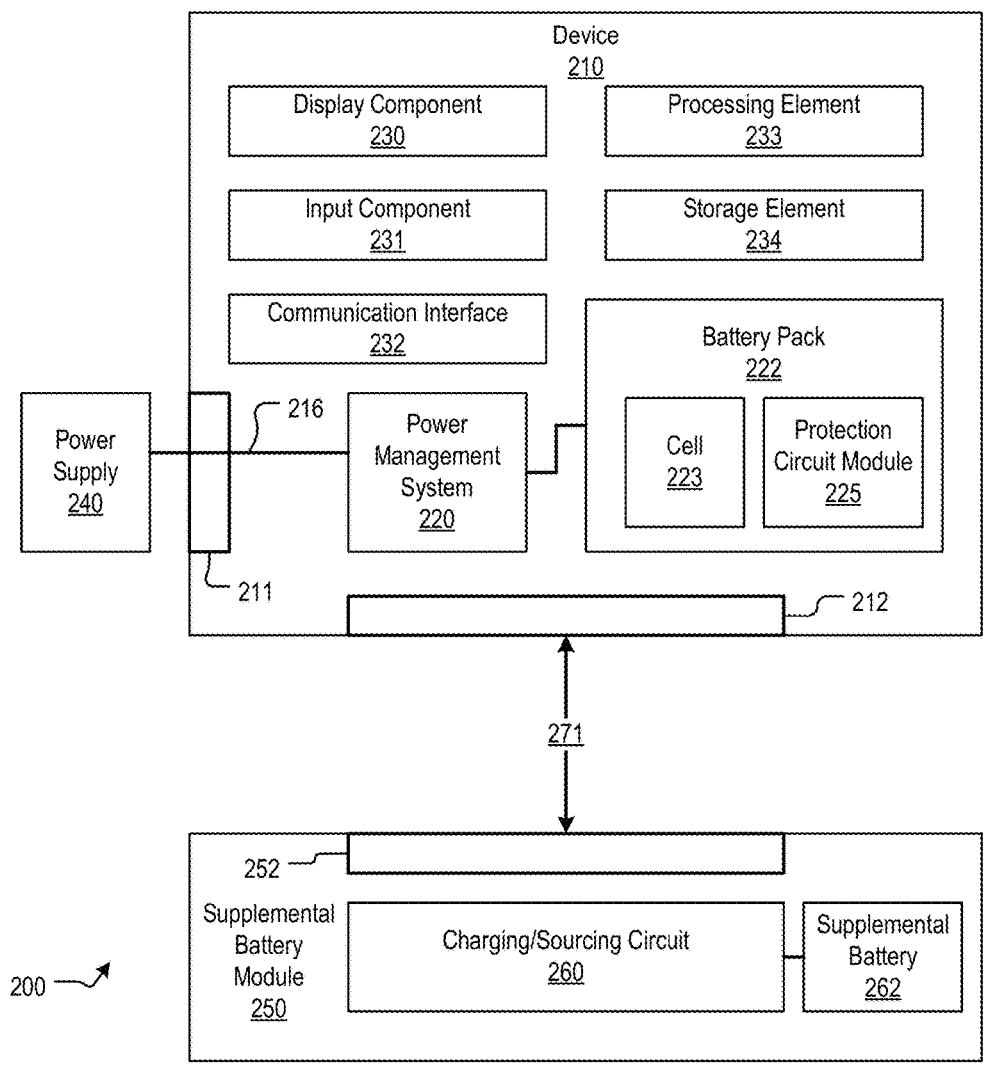
FIG. 2 illustrates a block diagram of a modular recharging system with a supplemental battery module, in accordance with embodiments of the present invention.

FIG. 2 is a block diagram of a modular system 200 comprising an electronic device 210 and a removable supplemental battery module 250, in accordance with embodiments of the present invention. The electronic device 210 is provided with a small capacity internal battery to reduce the size and weight of the device 210, and the supplemental battery 250 is provided with a larger capacity internal supplemental battery to provide extended battery life at the expense of increased size and weight. The electronic device 210 may be implemented as any of a number of battery-powered electronic devices, such as an e-book reader, tablet computing device, smartphone, media player, portable gaming device, portable digital assistant, wearable device, "Internet of Things" device with embedded electronics and a rechargeable battery, a powered accessory for any of the above-mentioned devices, and other battery-powered devices. Certain embodiments are particularly useful for electronic devices having small capacity batteries that experience variation in current draw during normal use, with periodic spikes caused by various operations on the device.

The electronic device 210 includes an internal device battery pack 222 and a power management system 220 for controlling the recharging of the device battery pack 222. The power management system 220 may be implemented using a power management integrated circuit (PMIC), which provides battery management, voltage regulation, and charging functions. The PMIC monitors various battery characteristics, such as the battery current draw and battery voltage. The device battery pack 222 may comprise any type of rechargeable battery suitable for use with the device's intended application, such and, more preferably, to batteries having high energy density chemistries, such as lithium ion (Li-ion), lithium ion polymer (Li-ion polymer) batteries, Li-metal-based batteries, solid electrolyte based batteries, or non-lithium-based batteries. In the illustrated embodiment, the device battery pack 222 comprises a protection circuit module 225 and a small capacity battery comprising a single Li-ion cell 223 having low area-specific resistance, as will be described in greater detail below. In other embodiments, the device battery pack 222 may include a plurality of cells connected in series.

The electronic device 210 may include a display component 230. The display component 230 may comprise, for example, an electrophoretic display (EPD), electrowetting display, electrofluidic display, interferometric modulator display, and/or any other type of bi-stable display. Alternatively, the display component 230 may comprise another type of device capable of rendering visible images, such as, e.g., liquid crystal display (LCD) screens, plasma-based flat panel displays, etc.

The electronic device 210 may include one or more input components 231 operable to receive inputs from a user. The input components 231 can include, for example, a push button, touch pad, touch screen, wheel, joystick, keyboard, mouse, trackball, keypad, accelerometer, light gun, game controller, or any other such device or element whereby a user can provide inputs to the electronic device 210. These input components 231 may be incorporated into the electronic device 210 or operably coupled to the electronic device 210 via wired or wireless interface. For electronic devices with touch sensitive displays, the input components 231 may comprise a touch sensor that operates in conjunction with the display component 230 to permit users to interact with the image displayed by the display component 230 using touch inputs (e.g., with a finger or stylus).

The electronic device 210 may also include at least one communication interface 232 comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol.

The electronic device 210 may also include a processing element 233 for executing instructions and retrieving data stored in a storage element 234 or memory. As would be apparent to one of ordinary skill in the art, the storage element 234 can include one or more different types of memory, data storage or computer-readable storage media, such as, for example, a first data storage for program instructions for execution by the processing element 233, and a second data storage for images or data and/or a removable storage for transferring data to other devices. The storage element 234 may store software for execution by the processing element 233, such as, for example, operating system software and user applications.

The electronic device 210 further includes a first interface 211 and a second interface 212, which provide power interfaces between the device 210 and other components of the system 200, as will be described in greater detail below. The first interface 211 may comprise a dedicated power port whose only function is to deliver power to recharge the device battery pack 222. Alternatively, the first interface 211 may comprise a multipurpose port which can include a power bus 216 for delivering power to the device battery pack 222 and a data bus for data communications between the device 210 and external devices connected to the first interface 211. USB connectors, micro-USB connectors, and mini-USB connectors are examples of commercially available multipurpose ports.

An external power supply 240 may be coupled to the first interface 211 to supply power to the device 210 via the power bus 216 in the first interface 211. The power supply 240 may comprise any type of power source, such as, for example, an AC power adapter which converts AC power from a standard household power receptacle into DC power supplied to the device 210. Alternatively, the power supply 240 may comprise a USB cable connected to a powered USB port, such as a port on a personal computer or powered USB hub. The AC power adapter may be configured to receive an input voltage of, e.g., 220-240VAC, and output a nominal 5 V voltage to the first interface 211.

The second interface 212 is removably couplable to a battery module interface 252 on the battery module 250 to enable both communications and power delivery between the device 210 and the battery module 250. The battery module 250 includes a supplemental battery 262 and a charging/sourcing circuit 260 (referred to herein as charging circuit 260). The charging circuit 260 is configured to operate the battery module 250 in a boost (sourcing) mode, in which power is supplied by supplemental battery 262 to the device 210 for recharging device battery pack 222 or directly powering the device 210, a charge mode, in which the battery module 250 receives power via the battery module interface 252 to recharge the supplemental battery 262 (e.g., an active state charge mode) or the charging circuit 260 is waiting to receive power via the battery module interface 252 (e.g., a stand-by state charge mode). The charging circuit 260 may further operate in a disconnect mode in which the supplemental battery 262 is electrically disconnected from battery module interface 252 to prevent any voltage/current from leaking across the battery module interface 252.

The electronic device 210 and the battery module 250 may be provided in any type of housing suitable for the device 210's intended use. FIGS. 3A-3D illustrate an exemplary electronic device 210 and supplemental battery module 250 in accordance with embodiments of the present invention.

Figure 3A:
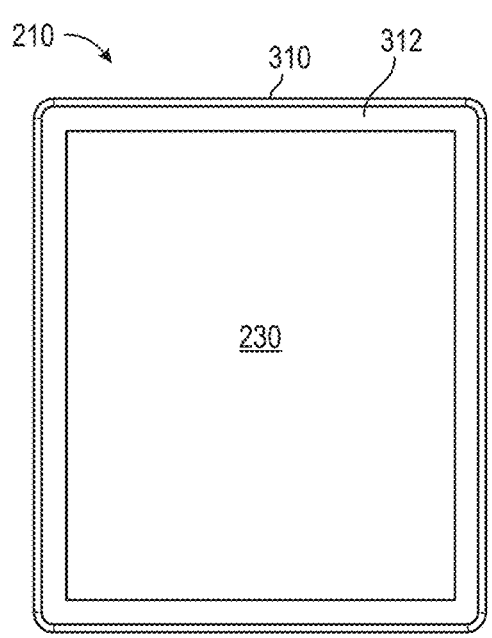
FIG. 3A illustrates a front view of an e-book reader device, in accordance with embodiments of the present invention.

FIG. 3A illustrates a front view of an e-book reader electronic device 210. FIG. 3B illustrates a rear perspective view of the electronic device 210. The electronic device 210 has a rectangular housing 310 and includes a touch screen display component 230 surrounded by a bezel 312. As can be seen in FIG. 3B, the illustrated embodiment of the electronic device 210 has a non-uniform cross-section with a thin portion 302, a thick portion 304, and a transition portion 303 between thin portion 302 and thick portion 304. The thick portion 304 may house certain components of the electronic device 210, such as the processing element 233, storage element 234, power management system 220, and device battery pack 222. In addition, a power switch 312 and the first interface 211 may be provided along an edge of the thick portion 304 of the housing 310. In the illustrated embodiment, the first interface comprises a micro-USB port. Such placement of certain components in the thick portion 304 may be advantageous for comfort of holding the electronic device 210 in one hand, such that the hand may more comfortably grip the thick portion 304. Furthermore, the weight of the thick portion 304 may provide better balance for holding the electronic device 210 with one hand.

Figure 3C:
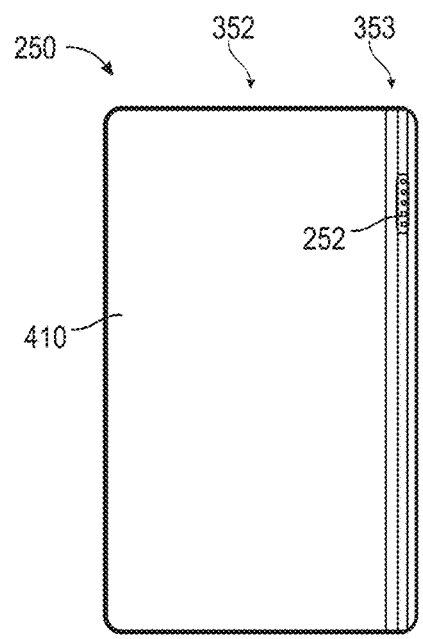
FIG. 3C illustrates a front view of supplemental battery module, in accordance with embodiments of the present invention.
Figure 3B:
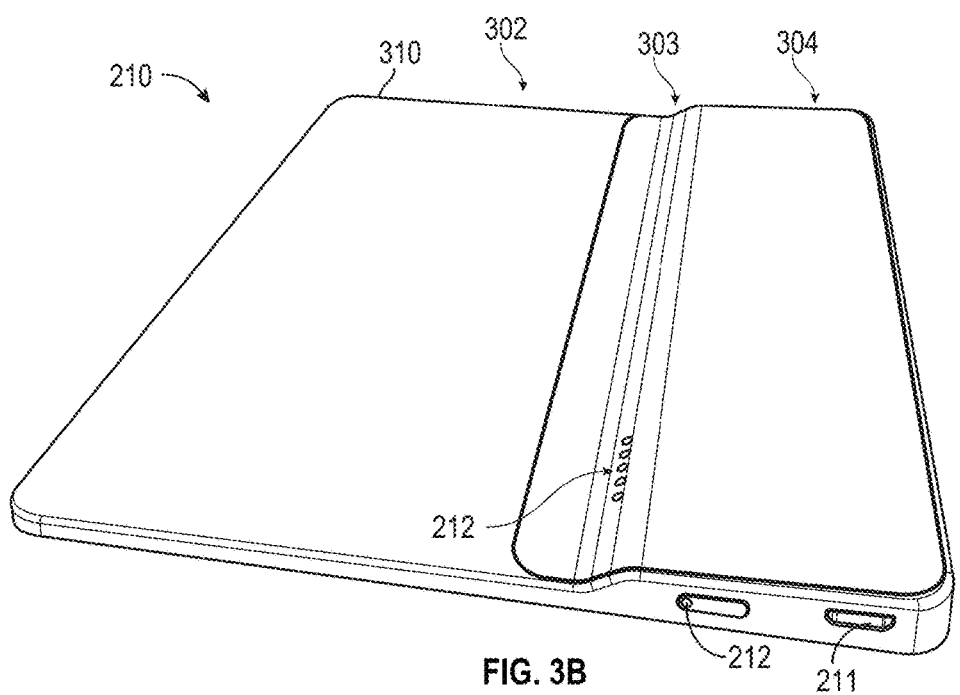
FIG. 3B illustrates a rear perspective view of an e-book reader device, in accordance with embodiments of the present invention.
Figure 3D:
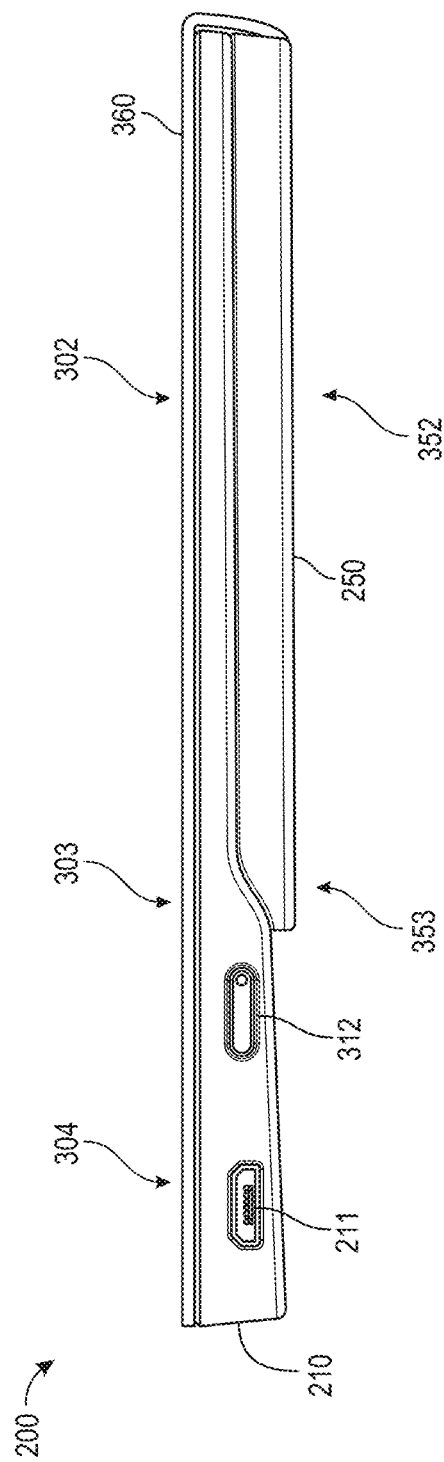
FIG. 3D illustrates a side view of an e-book reader device connected to a supplemental battery module, in accordance with embodiments of the present invention.

FIG. 3C illustrates a front view of a supplemental battery module 250 and FIG. 3D illustrates a side view of the electronic device 210 coupled to the battery module 250. The illustrated battery module 250 has a rectangular housing 410 having approximately the same length as the device 210, but slightly shorter width. When the battery module 250 is coupled with the electronic device 210, a body portion 352 of the battery module 250 is positioned adjacent to the thin portion 302 of the electronic device 210 and sloping portion 353 of the battery module 250 follows the contour of the transition portion 303 of the electronic device 210, thereby providing the system 200 with a roughly uniform cross-sectional thickness. As a result, when the battery module 250 is coupled with the device 210, the system 200 can be easily held by the user to simulate a single device. In the embodiment illustrated in FIG. 3D, the battery module 250 further includes an optional cover portion 360 that extends over the front of the electronic device 210 to cover and protect the display component 230. The cover portion 360 may be folded open like the cover of a book when the user desires to view the display component 230 and closed when the device 210 is not in use.

The electronic device 210 and the battery module 250 may include features to permit the device 210 and module 250 to be retained securely together when coupled, while being easily separable to enable the user to carry just the electronic device 210 when the extended battery life provided by the battery module 250 is not needed. These coupling features may comprise magnets provided on or near the facing surfaces of the device 210 and battery module 250 to provide a magnetic retaining force to securely maintain the coupling of the device 210 and battery module 250. Alternatively or additionally, the coupling features may comprise mechanical latches, clamps, or other mechanical fasteners to provide the desired retaining force between the device 210 and battery module 250.

In the illustrated embodiment, the second interface 212 of the electronic device 210 comprises a plurality of contacts provided on the transition portion 303, and the battery module interface 252 comprises a corresponding plurality of spring loaded pin contacts which form an electrical connection 271 with the contacts of the second interface 212 when the electronic device 210 is connected to the battery module 250. The coupling features may be used to maintain a secure electrical connection between the contacts and corresponding pins until the device 210 is separated from the battery module 250. In other embodiments, other types of interfaces may be used for the second interface 212 and the battery module interface 252, such as, for example, a plug and corresponding receptacle port (e.g., a USB connector).

Figure 4A:
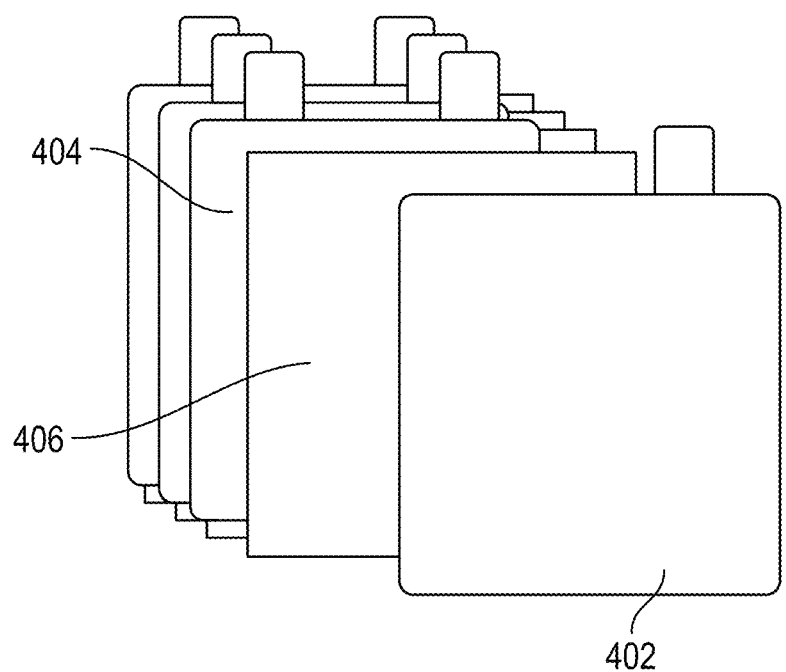
FIG. 4A illustrates a stacked cell structure.
Figure 4B:
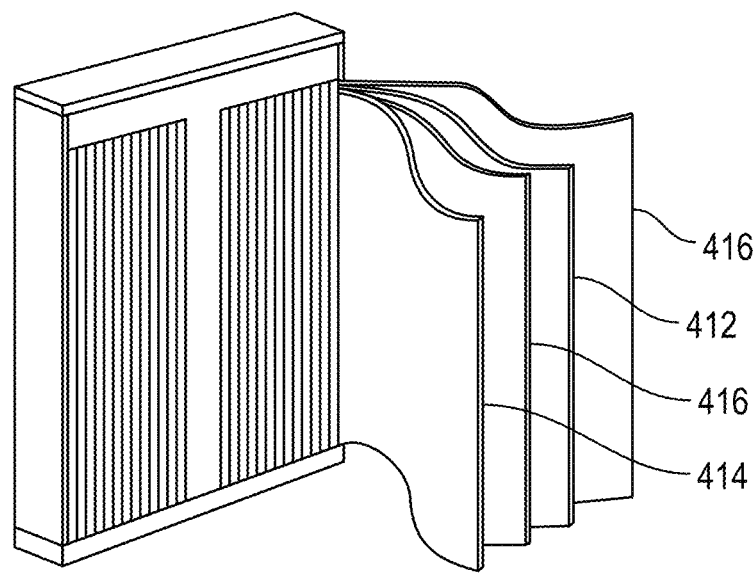
FIG. 4B illustrates a cross-section of wound cell structure, with an unraveled perspective.

Embodiments of the present invention may be implemented using battery cells with any desired chemistry and form factor. FIG. 4A is a perspective view illustrating an exemplary stacked cell structure used in pouch cells. FIG. 4B is a perspective view, cross-section including unraveled portion, a illustrating an exemplary wound cell structure used in pouch, prismatic, and cylindrical cells.

As shown in FIG. 4A, the stacked electrode structure includes a plurality of anode electrodes 402 stacked alternately with a plurality of cathode electrodes 404, with separators 406 separating the anodes 402 and cathodes 404. As shown in FIG. 4B, the wound cell structure includes a continuous anode electrode 412 and a continuous cathode electrode 414 separated by a continuous or segmented separator 416. These components 412, 414, 416 are wound about a mandrel to form a prismatic or cylindrical shape.

The anode electrodes and cathode electrodes in lithium ion cells may be formed in a variety of ways using similar processes. For example, the active electrode materials for the anodes and cathodes are coated on both sides of metallic foils, comprising, e.g., aluminum or copper, which act as the current collectors, when placed in electrolyte (e.g., lithium salt in organic solvent with additives), conducting the current in and out of the cell. The active anode material may comprise a form of carbon, silicon, or lithium metal, and the active cathode material may comprise a mixed metal oxide.

The design of battery cells requires selection of a large number of design parameters. For example, the anode and cathode electrode parameters may include, for example, the percentage of active material in the active material coating, the active material specific capacity, the coating weight, the final coating thickness, and electrode density. In the example described below, the battery cell has an active material specific capacity of approximately 350 mAh/g for the anode and approximately 150 mAh/g for the cathode, a coating weight of approximately 6 mg/cm$^2$ for the anode and approximately 13 mg/cm$^2$ for the cathode, a final coating thickness of approximately 35 μm for the anode and approximately 30 μm for the cathode, and an electrode density of approximately 1.5 g/cm$^3$ for the anode and approximately 4.0 g/cm$^3$ for the cathode. These parameters are merely exemplary and may vary in other embodiments.

The area-specific resistance (ASR) of a battery cell can have a significant impact on battery performance. In particular, when using a battery cell with a small capacity (e.g., less than about 400 mAh), the impact on AC impedance and DC resistance value is much larger than in a large capacity battery cell (e.g., greater than about 500 mAh).

The DC resistance value is the measurement of resistance when a DC load is applied for an extended period of time, e.g., greater than 10 msec. AC impedance is the measurement of impedance when an AC load is applied, typically over much shorter timeframes than in DC resistance value measurements, e.g., 1 msec. In accordance with embodiments of the present invention, cells having a low ASR are used in a small capacity battery pack in order to produce improved battery performance. In particular, a low capacity battery cell (e.g., less than or equal to approximately 400 mAh) has an AC impedance ASR of between about 5 Ohm-cm$^2$ and 21 Ohm-cm$^2$ (e.g., approximately 11 Ohm-cm$^2$), and a DC resistance value ASR of between about 10 Ohm-cm$^2$ and 41 Ohm-cm$^2$ (e.g., approximately 26 Ohm-cm$^2$). The AC impedance is measured at 1 KHz, 23° C. +/−2° C., 0% to 100% state of charge (SOC). The DC resistance value is measured at 0.5A for a 50 msec pulse at 4.0V OCV (open circuit voltage) or less than 85% state-of-charge, and 23° C. +/−2° C.

In accordance with some embodiments, the total cell AC impedance is less than or equal to about 200 mOhm (max), or, more preferably, less than about 50 mOhm, measured at 1 KHz, 23° C. +/−2° C., 0% to 100% SOC, and the total cell DC resistance value is less than or equal to about 200 mOhm (max), or, more preferably, less than about 200 mOhm, measured at 0.5A for a 50 msec pulse at 4.0V OCV, and 23° C. +/−2° C.

Power density is defined as power per unit volume or per unit mass. Volumetric energy density is the amount of energy stored per unit volume, often measured in Wh/L. Gravimetric energy density is the amount of energy stored per unit weight, often measured in Wh/kg. In accordance with some embodiments, regarding <3 mm thick cells, the volumetric energy density of the cells is greater than or equal to approximately 250 Wh/L, or, more specifically, greater than approximately 300 Wh/L, and the gravimetric energy density of the cells is greater than or equal to approximately 124 Wh/kg, or, more specifically, greater than approximately 160 Wh/kg. Energy density is the amount of energy stored in a given system or region of space per unit volume or mass.

In accordance with some embodiments, the battery pack is used in an e-book reader device. The e-book reader device may be a standalone reader or may be part of a modular system with a removable battery module, as described above with reference to FIGS. 1 and 3A-3D.

In accordance with some embodiments, the battery pack is used in a small form factor electronic device, such as a smartwatch, a short-range wireless headset, rechargeable battery powered wearable device (e.g., pendant, wristband, glasses), music player, or an "Internet of Things" device with embedded electronics and a rechargeable battery.

As described above, for many electronic devices, small reductions in size are extremely desirable. Embodiments of the present invention may be particularly useful in electronic devices in which the battery pack occupies a volume of less than or equal to 10 cm$^3$ within the housing of the device, or, more preferably less than or equal to 5 cm$^3$.

In the exemplary embodiment shown in FIG. 1, the battery pack 222 having a total capacity of 250 mAh and external dimensions of, for example, 2.42 mm thickness (with 2.55 mm maximum after swelling), 33.43 mm width, and 40.55 mm length, with each battery cell having external dimensions of, for example, 2.32 mm thickness, 33.33 mm width, and 37.15 mm length. In other embodiments, the external dimensions may vary from this example, e.g., by +/−50% or +/−25%. The cell volumetric energy density is approximately 322 Wh/L, the gravimetric energy density is approximately 168 Wh/kg, the total cell electrode surface is approximately 155 cm$^2$, with a cell AC impedance of approximately 70 mOhm (max) and cell AC impedance ASR of approximately 11 Ohm-cm$^2$, both measured at 1 KHz, 23° C. +/−2° C., 0% to 100% SOC, and a cell DC resistance value of approximately 170 mOhm (max) and cell DC resistance value ASR of approximately 26 Ohm-cm$^2$, both measured at 0.5A for a 50 msec pulse at 4.0V OCV, and 23° C. +/−2° C. The cell electrolyte has a conductivity of greater than 6×10$^{-3}$ S/cm. The cell separator has a thickness of less than 12 μm. The battery pack pouch material has a thickness of less than 200 μm. It is to be understood that this is merely an exemplary embodiment, and other embodiments may have different characteristics.

Figure 5:
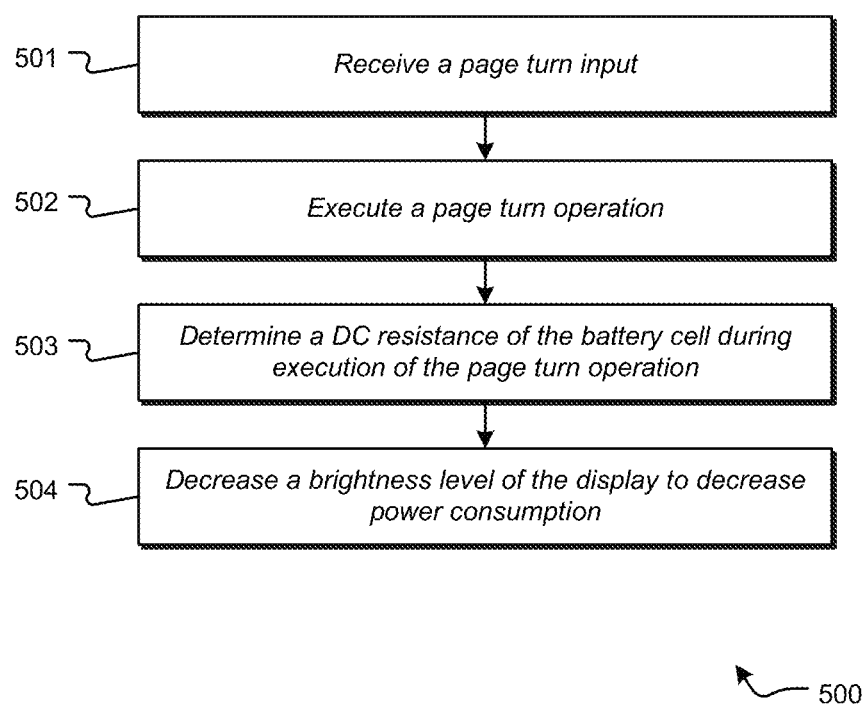
FIG. 5 is a flowchart of a method of managing battery consumption using event-based trigger, in accordance with embodiments of the present invention.

FIG. 5 is a flowchart 500 of a method of managing battery consumption using event-based trigger, in accordance with embodiments of the present invention. In step 501, the device receives a page-turn input. In step 502, the device executes the requested page-turn operation. In step 503, the device determines a DC resistance value of the battery cell during execution of the page-turn operation. In step 504, the device decreases a brightness level of the display to decrease power consumption.

Various methods have been used to measure the battery capacity (typically provided in mAh) or SOC of a battery (typically provided as a percentage of remaining capacity within the system) during operation of the device powered by the battery. Because cell voltage decreases as the remaining battery capacity, one simple method of measuring capacity is by measuring the voltage of the battery. However, this approach may produce inaccurate results for a variety of reasons. First, the battery voltage varies depending on the current draw, such that any operation that requires a high current draw from the battery will result in a temporary decrease in battery voltage, particularly in smaller capacity batteries. Because this voltage drop is caused by the spike in current draw and not in a decrease in battery capacity, a measurement of battery voltage may provide an inaccurate indication of a low battery capacity. The AC impedance of the battery may also be used to assess battery capacity. For larger capacity battery cells, AC impedance is close to DC resistance value. However, for smaller capacity batteries, AC impedance is dramatically different from DC resistance value and can produce inaccurate capacity results. This is primarily the result of ASR and DC resistance value time domains. A larger capacity cell generally has more parallel resistances and as a result better DC resistance values.

In accordance with embodiments of the present invention, the DC resistance value of a battery during execution of a functional operation of an electronic device is used to assess remaining battery capacity. Determining DC resistance value while the battery is under a normal operational load event can provide a more accurate assessment of battery capacity than measuring AC impedance, which relies on a model of a load response instead of an actual load. DC resistance value provides a more direct measurement reflecting remaining battery capacity under actual current loads, as opposed to AC impedance, which is more of a prediction based on a model of the SOC. Any functional operation may be used, but in various embodiments described herein, the functional operation used for DC resistance value determinations is a page-turn operation on an e-reader device. An e-reader device has a single primary function to display text for reading. Accordingly the page-turn operation is one that is routinely performed by the device. In addition, the load imposed by a page-turn operation is fairly consistent for each page-turn, thereby producing a consistent battery load signature that can be tracked over time to assess diminishing battery capacity. The ability to dynamically track DC resistance values of a small capacity battery can provide accurate feedback for triggering software in the e-reader device to initiate a power-saving mode.

Figure 6:
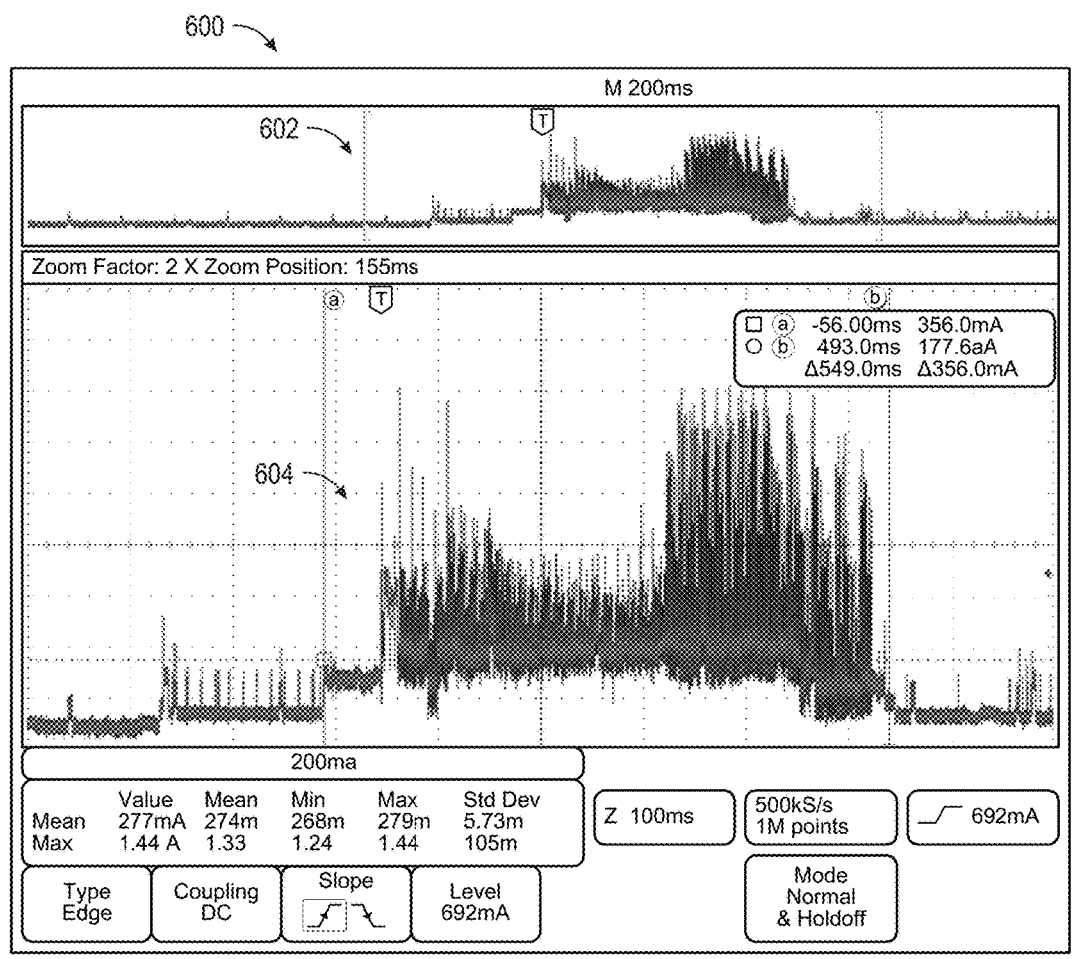
FIG. 6 depicts an illustrative current measurement plot during execution of a page-turn operation.

FIG. 6 depicts an illustrative current measurement plot 600 during execution of a page-turn operation. The PMIC of the power management system 220 can be used to monitor the battery current draw and battery voltage during the execution of the page-turn operation. The upper plot 602 depicts the current over an extended period of time and the lower plot 604 is an enlarged depiction of a portion of the current in plot 602.

With current and voltage measurements taken under a DC load, Ohm's Law may be used to calculate DC resistance values during the page-turn operation. The DC resistance value can be calculated in a variety of ways. For example, the weighted average current or maximum peak current could be used, in combination with measured voltage to determine DC resistance values. In other embodiments, other integration techniques could be used, such as, e.g., a Fourier transformation of both voltage and current changes.

The processing element 233, power management system 220, or other processing component can use this DC resistance information to accurately initiate a power saving mode when the battery capacity drops below a threshold level. The voltage and current measurements (and, as a result, the DC resistance value determinations) may vary depending on the temperature of the battery, the type of load being applied, and the time periods during which those measurements are taken. The battery pack would typically include a temperature sensor, such as a thermistor, which monitors the temperature of the battery cells. The battery pack can then be tested at various temperatures, loads, capacity levels, and other operating conditions to identify the DC resistance values that would be observed at different temperatures, loads, capacity levels, and other operating conditions. This empirical data can then be used to identify the threshold DC resistance levels that should be utilized under varying conditions. During operation by the user, the algorithm implemented by the processing component would take into account the temperature and/or other operating conditions in determining whether the DC resistance value has exceeded the target threshold.

In addition, the type of event being monitored may result in a change in the threshold DC resistance level. For example, for an event which results in a relatively small current load, such as, e.g., a page-turn operation, it may be desirable to set the threshold DC resistance level at a relatively high level, as compared to the threshold DC resistance level for an event which results in a large current load, such as, e.g., a wireless radio transmission. This is because for large current load operations, it may be particularly desirable to prevent the battery from going too low. However, for a low current load page-turn event, there is a lower risk of sudden battery drop, and therefore the threshold DC resistance level can be made higher. In view of the temperature, current, and voltage variations experienced by a device in normal use, these approaches for tracking DC resistance values can provide superior battery capacity assessments than AC impedance techniques, which rely on modeled battery usage. For each type of event for which DC resistance monitoring will be used, an initial load analysis and DC resistance value characterization may be made in order to set the appropriate threshold DC resistance level based on the load and other environmental characteristics.

The DC resistance value measurements for assessing battery capacity can be made on any desired schedule. In some embodiments, the DC resistance value may be measured during every page-turn operation. Alternatively, in order to reduce the processing load imposed by these measurements, the DC resistance value may be calculated on a periodic basis, such as, for example, every 10 or 100 page-turn operations. In some embodiments, the frequency of the DC resistance value measurements may vary, depending on the state of the device. For example, when the SOC of the battery is known to be very high, the DC resistance value measurements may be made at a low frequency, e.g., every 100 page-turn operations. When the SOC of the battery is known to be low, the DC resistance value measurement may be made at a higher frequency, e.g., every 10 page-turn operations.

Figure 7A:
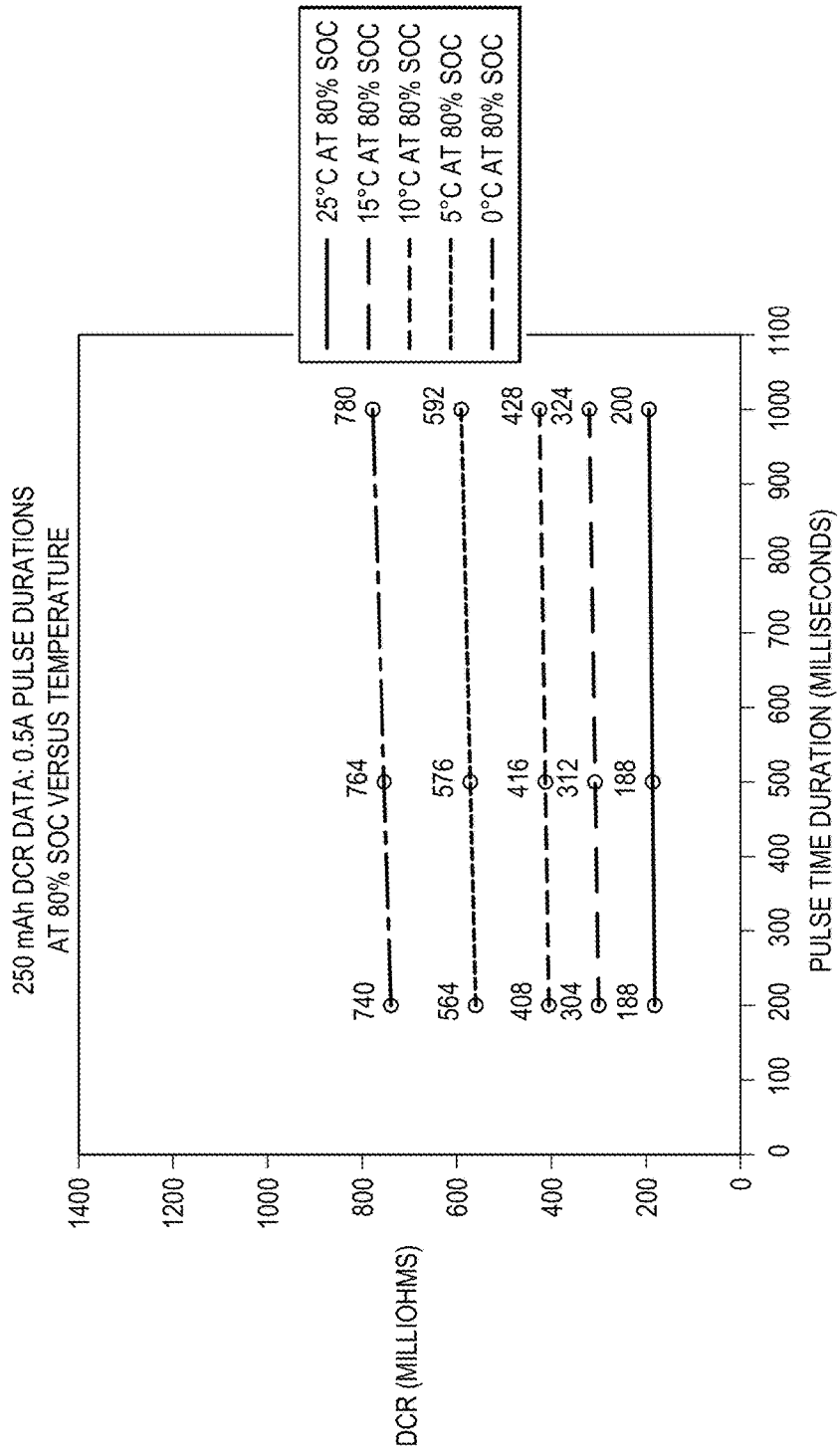
FIGS. 7A-7C depict illustrative DC resistance levels during varying battery states.
Figure 7B:
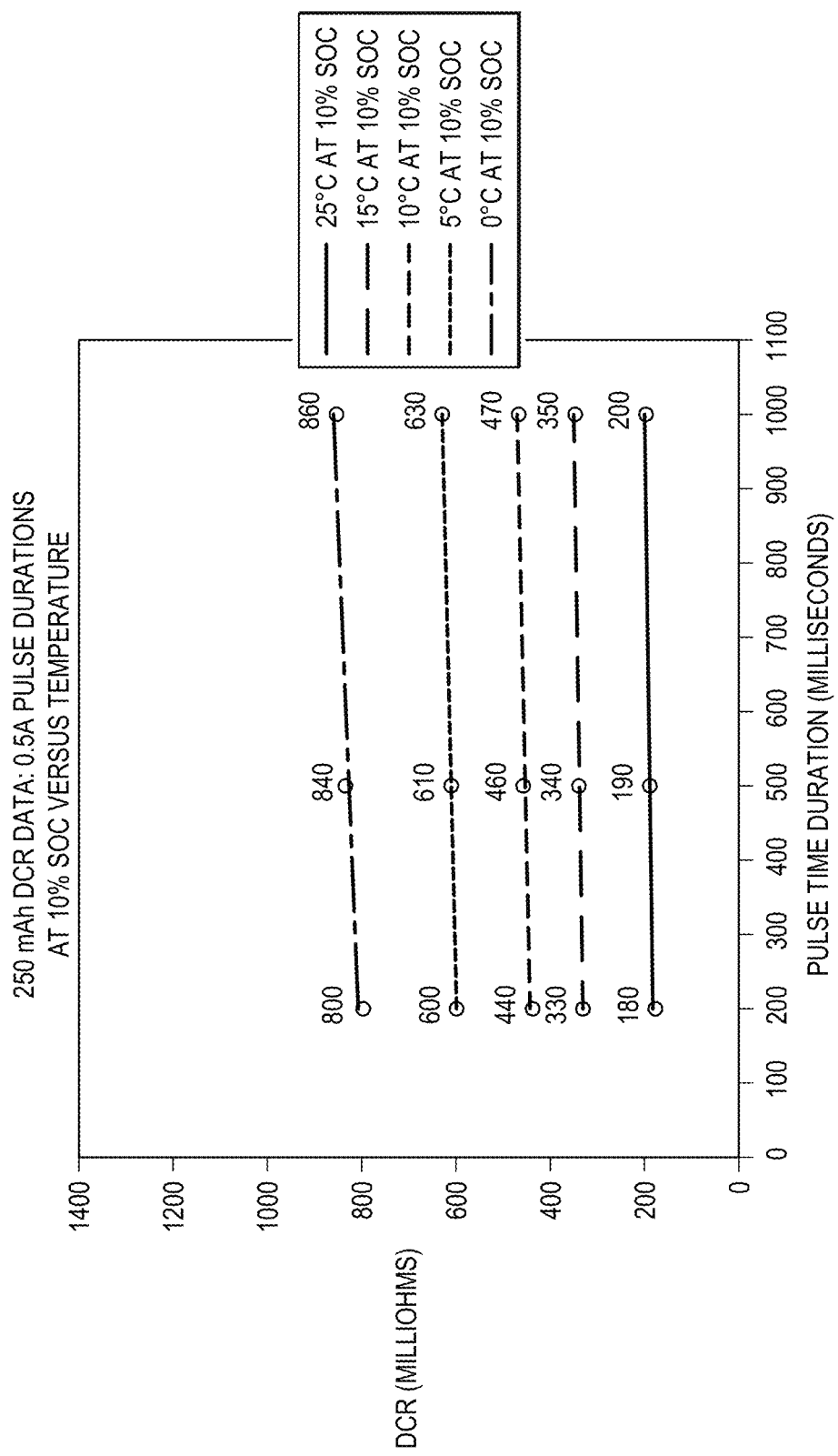
Figure 7C:
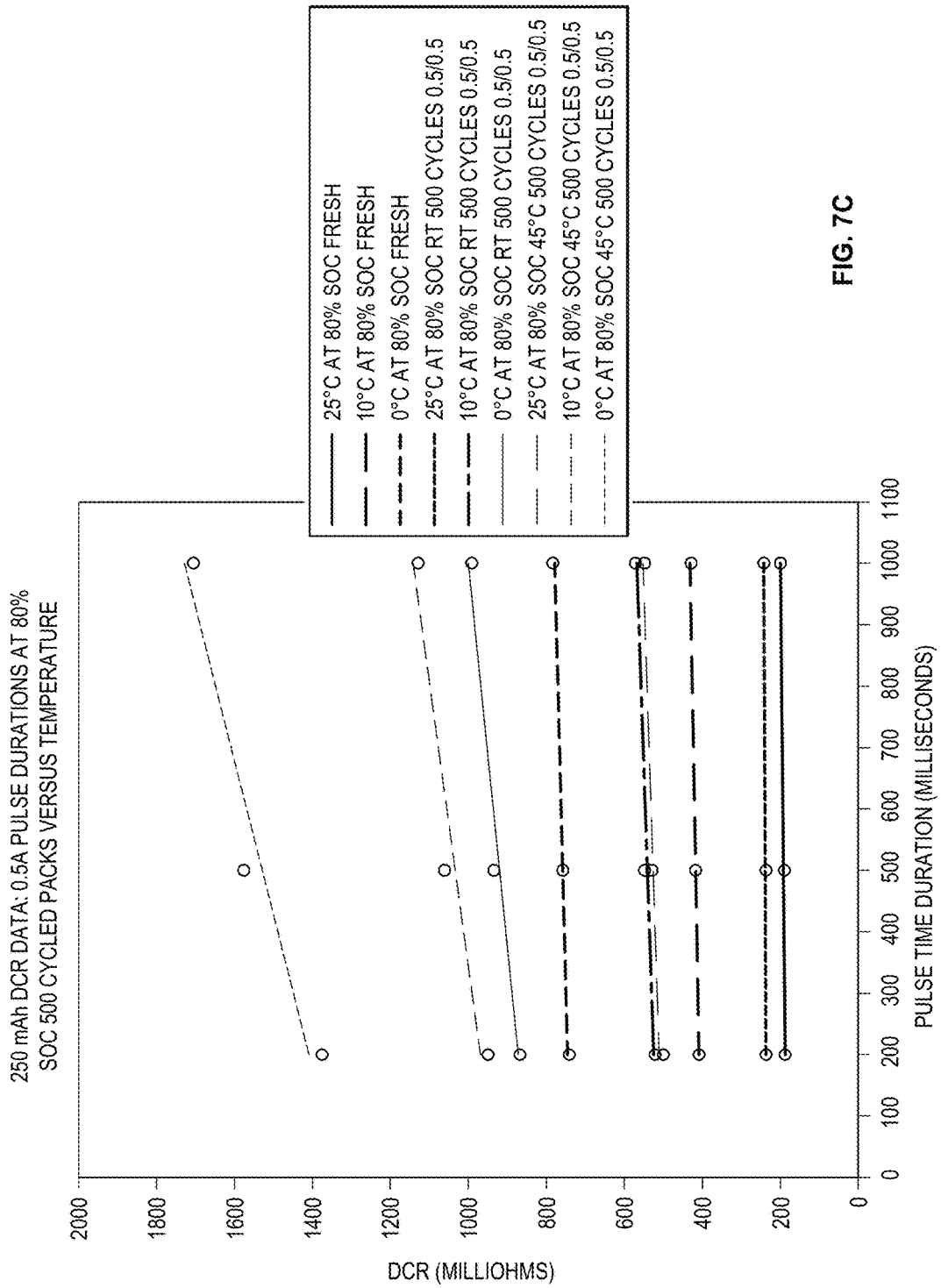

FIGS. 7A-7C depict DC resistance values during varying battery states to illustrate the impact of battery state on DC resistance levels. In FIGS. 7A-7C, the DC resistance values are determined for a 250 mAh capacity battery cell during a 0.5A pulse, which corresponds to a 2 C rate for a 250 mAh battery. These DC resistance values may be determined for 100 msec, 500 msec, and 1000 msec at different temperatures ranging from 0° C. to 25° C.

In FIG. 7A, the DC resistance value is determined with the battery cell at a 80% SOC and the battery cell temperature at 0° C., 5° C., 10° C., 15° C., and 25° C. The DC resistance value is determined by measuring the drop in voltage during the 0.5A current pulse, with the DC resistance value being determined using R=V/I, As shown in FIG. 7A, the DC resistance values at 25° C. range from 188-200 mOhm, with the DC resistance values steadily increasing with decreasing temperatures. At 0° C., the DC resistance values increase to a range of 740-780 mOhm, despite the battery cell being at the same SOC. As a result, it may be desirable to increase the threshold DC resistance levels for initiating the power-saving mode at lower battery cell temperatures. The threshold DC resistance level should scale as a function of increasing DC resistance. For example, at 0° C., the DC resistance is about four times greater than the DC resistance at 25° C. As a result, it may be desirable to adjust the threshold DC resistance level as a function of this changing DC resistance with temperature.

In FIG. 7B, the DC resistance value is determined with the battery cell at a 10% SOC and the battery cell temperature at 0° C., 5° C., 10° C., 15° C., and 25° C. FIG. 7B shows that at 25° C. there is a negligible difference in DC resistance values when the battery cell SOC drops from 80% (shown in FIG. 7A) to 10% (shown in FIG. 7B). Therefore, at temperatures above approximately 25° C., the threshold DC resistance levels may not be adjusted based on the battery SOC or may be adjusted by a small amount based on the battery SOC. However, the battery SOC has a significant impact on DC resistance values at lower temperatures. For example, at 0° C. and 80% SOC, the DC resistance values range from 740-780 mOhm, while at 0° C. and 10% SOC, the DC resistance values range from 800-860 mOhm. As a result, it may be desirable to decrease the threshold DC resistance levels for initiating the power-saving mode based on the SOC of the battery cell at lower battery cell temperatures.

In FIG. 7C, the DC resistance value is determined with the battery cell at a 80% SOC using a fresh battery cell that has not be recharged, and after the battery cell has experienced 500 recharging cycles. As shown in FIG. 7C, at 25° C., the DC resistance levels increase slightly after 500 recharging cycles, going from approximately 180-200mOhm with a fresh battery cell to approximately 220-240 mOhm with the battery cell after 500 recharging cycles. At 0° C., the DC resistance values increase significantly after 500 recharging cycles, going from approximately 740-860 mOhm with a fresh battery cell to approximately 860-1000 mOhm with the battery cell after 500 recharging cycles. As a result, it may be desirable to decrease the threshold DC resistance levels for initiating the power-saving mode as a function of the number of recharging cycles experienced by the battery (sometimes referred to as the "age" of the battery). As the number of recharging cycles increase, the threshold DC resistance level may be decreased as well.

Figure 8:
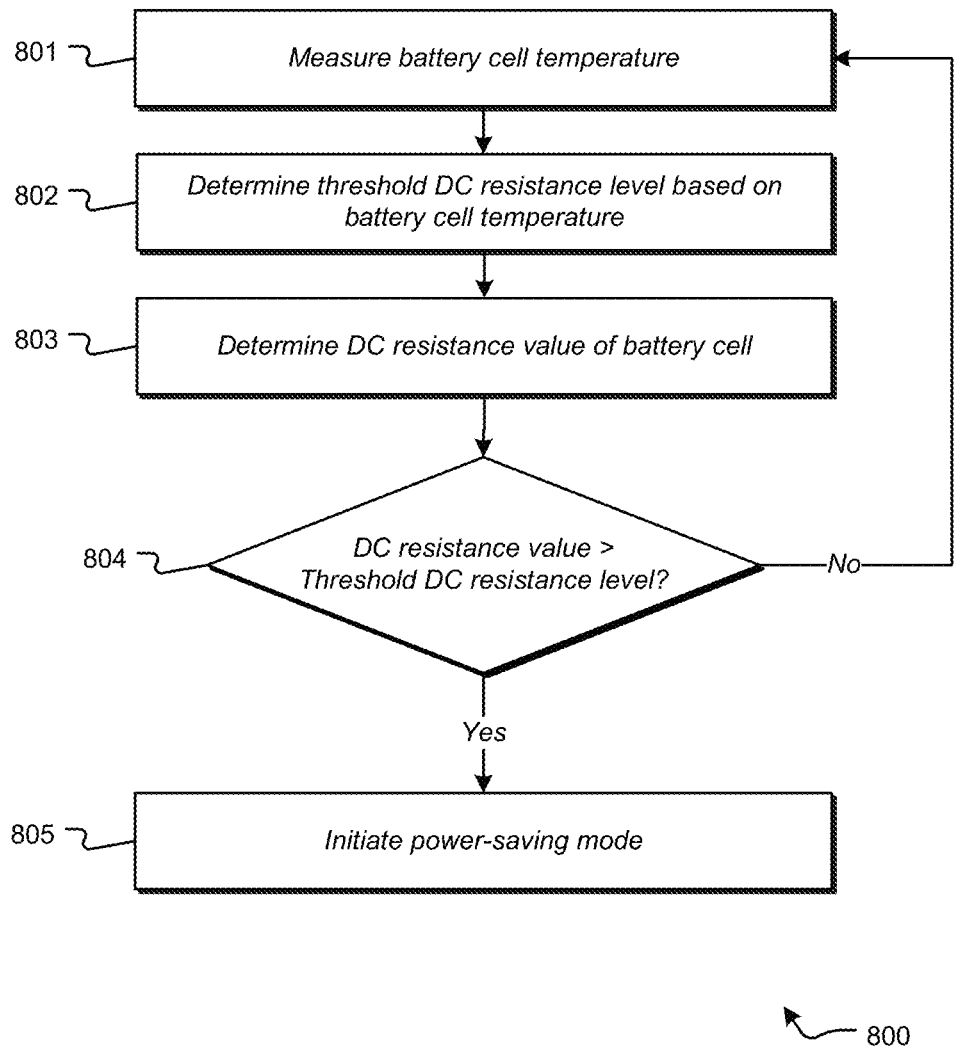
FIG. 8 is a flowchart of a method of managing battery consumption using adaptive battery management, in accordance with embodiments of the present invention.

FIG. 8 is a flowchart 800 of a method of managing battery consumption using adaptive battery management, in accordance with embodiments of the present invention. In step 801, the device measures the temperature of the battery cell. In step 802, the device determines the threshold DC resistance level for initiating a power-saving mode based on the measured temperature and/or other device states. In step 803, the device determines a DC resistance value of the battery cell. In step 804, the determined DC resistance value is compared to the determined threshold DC resistance level. If the determined DC resistance value is less than the determined threshold DC resistance level, the method returns to step 801. If the determined DC resistance value is greater than the determined threshold DC resistance level, the power-saving mode is initiated.

Embodiments of the present invention may provide various advantages not provided by prior art systems. Devices which track DC resistance values may be able to more effectively manage battery consumption than conventional devices, thereby providing improvements in battery life over conventional batteries.

While the invention has been described in terms of particular embodiments and illustrative figures, those of ordinary skill in the art will recognize that the invention is not limited to the embodiments or figures described. Many of the embodiments described above are directed to an e-book reader electronic device having a small capacity battery. These embodiments can be particularly advantageous for e-book readers because users of e-book readers have very high expectations regarding light device weight (e.g., less than 8 oz.) and extended battery capacity (e.g., several weeks or months of battery life between recharges). However, any type of battery-powered electronic device may be used in other embodiments, such as mobile phones, tablet computers, smart watches, and the like.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the processes, flowcharts, and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system, such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method of operating an electronic device having a processing component and a battery cell, the method comprising:
   measuring a first temperature of the battery cell;
   determining a first threshold DC resistance level at which the electronic device initiates a power-saving mode based at least in part on the first temperature;
   determining a first DC resistance value of the battery cell based on current load and voltage change of the battery cell;
   determining that the first DC resistance value of the battery cell is above the first threshold DC resistance level; and
   initiating the power-saving mode.

2. The method of claim 1, further comprising
   prior to initiating the power-saving mode, operating a display of the electronic device at a first brightness level; and
   wherein initiating the power-saving mode comprises operating the display a second brightness level lower than the first brightness level.

3. The method of claim 1, further comprising:
   prior to initiating the power-saving mode, operating a wireless radio of the electronic device at a first power output level; and
   wherein initiating the power-saving mode comprises operating the wireless radio at a second power output level lower than the first power output level.

4. The method of claim 1, further comprising:
   determining a number of recharge cycles experienced by the battery cell; and
   determining the first threshold DC resistance level based at least in part on the first temperature and the number of recharge cycles experienced by the battery cell.

5. The method of claim 1, further comprising:
   determining a state of charge of the battery cell; and
   determining the first threshold DC resistance level based at least in part on the first temperature and the state of charge of the battery cell.

6. The method of claim 1, wherein:
   measuring the first temperature of the battery cell comprises measuring the first temperature of the battery cell having a capacity of less than about 400 mAh.

7. The method of claim 1, further comprising:
   operating a display of the electronic device at a first brightness level;
   receiving a request to execute a power-consuming operation;
   decreasing a brightness level of the display from the first brightness level to a second brightness level; and
   executing the power-consuming operation.

8. The method of claim 7, wherein:
   receiving the request to execute the power-consuming operation comprises receiving a request to initiate a wireless connection.

9. The method of claim 1, wherein the determining the first DC resistance value of the battery cell based on current load and voltage change of the battery cell comprises:
   determining an average current load on the battery cell over a first time period;
   determining an average voltage change of the battery cell over the first time period; and
   determining the first DC resistance value as an average DC resistance value of the battery cell calculated by dividing the average voltage change by the average current load.

10. The method of claim 1, wherein:
    determining a peak current load on the battery cell over a first time period;
    determining a peak voltage change of the battery cell over the first time period; and
    calculating a peak DC resistance value of the battery cell by dividing the peak voltage change by the peak current load.

11. The method of claim 1, further comprising:
    determining a plurality of DC resistance values of the battery cell during a measurement period;
    determining that each of the plurality of DC resistance values of the battery cell during the measurement period is above the first threshold DC resistance level; and
    initiating the power-saving mode.

12. The method of claim 1, further comprising:
    determining that a subsequently measured second DC resistance value is below the first threshold DC resistance level; and
    exiting the power-saving mode.

13. The method of claim 1, further comprising:
    measuring a second temperature of the battery cell less than the first temperature; and
    determining a second threshold DC resistance level at which the electronic device initiates the power-saving mode based at least in part on the second temperature, wherein the second threshold DC resistance level is less than the first threshold DC resistance level.

14. An electronic device, comprising:
    a display;
    a rechargeable battery cell;
    a processing component; and
    a computer-readable memory storing computer-executable instructions which when executed cause the processing component to perform a method comprising:
    measuring a first temperature of the rechargeable battery cell;
    determining a first threshold DC resistance level based at least in part on the first temperature; and
    determining a first DC resistance value of the rechargeable battery cell based on current load and voltage change of the battery cell;
    determining that the first DC resistance value of the rechargeable battery cell is above the first threshold DC resistance level; and
    initiating a power-saving mode.

15. The electronic device of claim 14, wherein the rechargeable battery cell has a capacity of less than about 400 mAh.

16. The electronic device of claim 14, wherein the computer-executable instructions cause the processing component to perform the method further comprising:
    prior to initiating the power-saving mode, operating a display of the electronic device at a first brightness level; and wherein initiating the power-saving mode comprises operating the display a second brightness level lower than the first brightness level.

17. The electronic device of claim 14, wherein the computer-executable instructions cause the processing component to perform the method further comprising:
   determining one or more of a number of recharge cycles experienced by the rechargeable battery cell or a state of charge of the rechargeable battery cell; and
   determining the first threshold DC resistance level based at least in part on the first temperature and one or more of the number of recharge cycles experienced by the rechargeable battery cell or the state of charge of the rechargeable battery cell.

18. A method of operating an electronic device having a processing component and a battery cell, the method comprising:
   measuring a first temperature of the battery cell;
   determining a first threshold DC resistance level at which the electronic device initiates a power-saving mode based at least in part on the first temperature;
   determining a first DC resistance value of the battery cell based on a current load and voltage change of the battery cell, wherein the current load and voltage change of the battery cell are determined over a time period corresponding to a page turn operation of the electronic device;
   determining that the first DC resistance value of the battery cell is above the first threshold DC resistance level; and
   initiating the power-saving mode.

19. The method of claim 18, further comprising
   prior to initiating the power-saving mode, operating a display of the electronic device at a first brightness level; and
   wherein initiating the power-saving mode comprises operating the display a second brightness level lower than the first brightness level.

20. The method of claim 18, further comprising:
   prior to initiating the power-saving mode, operating a wireless radio of the electronic device at a first power output level; and
   wherein initiating the power-saving mode comprises operating the wireless radio at a second power output level lower than the first power output level.

* * * * *